United States Patent
Yusim et al.

(10) Patent No.: US 11,444,425 B2
(45) Date of Patent: Sep. 13, 2022

(54) CHIRPED PULSE AMPLIFICATION LASER SYSTEM

(71) Applicant: IPG PHOTONICS CORPORATION, Oxford, MA (US)

(72) Inventors: Alex Yusim, Boston, MA (US); Bruce Jenket, Worcester, MA (US); Anton Drozhzhin, Avon, CT (US); George Venus, Oxford, MA (US); Igor Samartsev, Westborough, MA (US); Dmitry Pestov, Oxford, MA (US); Anton Ryabtsev, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 368 days.

(21) Appl. No.: 16/496,828

(22) PCT Filed: Mar. 29, 2018

(86) PCT No.: PCT/US2018/025152
§ 371 (c)(1),
(2) Date: Sep. 23, 2019

(87) PCT Pub. No.: WO2018/183683
PCT Pub. Date: Oct. 4, 2018

(65) Prior Publication Data
US 2020/0127430 A1  Apr. 23, 2020

Related U.S. Application Data

(60) Provisional application No. 62/478,123, filed on Mar. 29, 2017.

(51) Int. Cl.
*H01S 3/00* (2006.01)
*H01S 3/08* (2006.01)
(Continued)

(52) U.S. Cl.
CPC ........ *H01S 3/0057* (2013.01); *H01S 3/08009* (2013.01); *H01S 3/08013* (2013.01);
(Continued)

(58) Field of Classification Search
None
See application file for complete search history.

(56) References Cited

U.S. PATENT DOCUMENTS

| 5,499,134 A | * | 3/1996 | Galvanauskas | ...... G02B 6/2713 359/333 |
| 5,847,863 A | * | 12/1998 | Galvanauskas | ....... H01S 3/0057 359/341.3 |

* cited by examiner

*Primary Examiner* — Mark Hellner
(74) *Attorney, Agent, or Firm* — Yuri Kateshov, Esq.

(57) ABSTRACT

The ultra-short pulse chirped pulse amplification (CPA) laser system and method of operating CPA laser system include outputting nearly transform limited (TL) pulses by a mode locked laser. The system and method further include temporarily stretching the TL pulses by a first Bragg grating providing thus each stretched pulse with a chirp which is further compensated for in a second Bragg grating operating as as a compressor. The laser system and method further include a pulse shaping unit measuring a spectral phase across the recompressed pulse and further adjusting the deviation of the measured spectral phase from that of the TL pulse by generating a corrective signal. The corrective signal is applied to the array of actuators coupled to respective segments of one of the BGs which are selectively actuated to induce the desired phase change, with the one BG thus operating as both stretcher/compressor and pulse shaper.

15 Claims, 6 Drawing Sheets

(51) Int. Cl.
*H01S 3/10* (2006.01)
*H01S 3/13* (2006.01)
*H01S 3/23* (2006.01)

(52) U.S. Cl.
CPC .......... *H01S 3/1003* (2013.01); *H01S 3/1301* (2013.01); *H01S 3/1307* (2013.01); *H01S 3/2308* (2013.01)

Known art

Known art

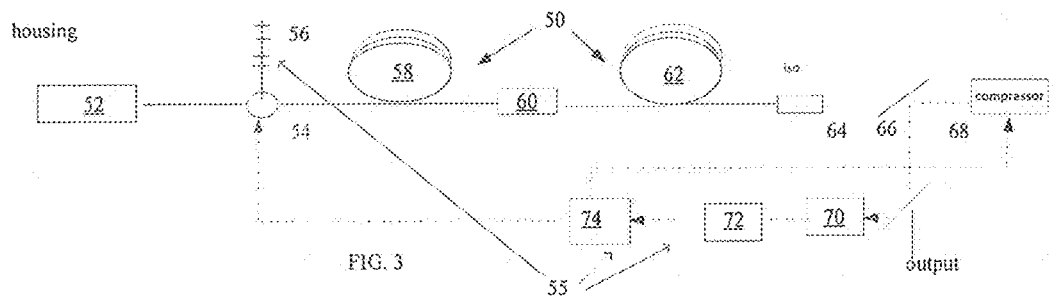
FIG. 3
FIG. 4A
Known art
SHG spectra for $\phi_2^{(-)}$ and $\phi_2^{(+)}$ chirp
(applied by the shaper)
FIG. 4B
Known art
Retrieved GDD profile
(using the formula above)
FIG. 4C
Known art
Calculated phase correction
(double integration)
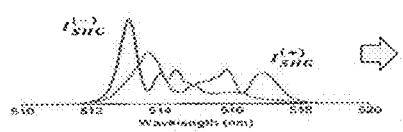
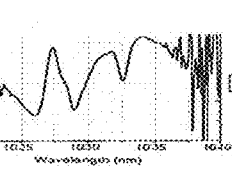
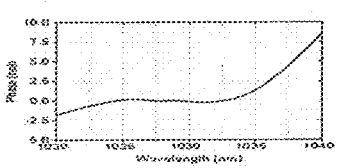
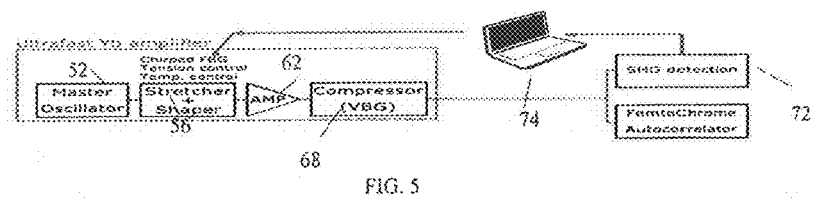
FIG. 5

CHIRPED PULSE AMPLIFICATION LASER SYSTEM

BACKGROUND OF THE DISCLOSURE

Field of the Disclosure

The present invention relates to a chirped pulse amplification laser system with scalable output power and improved pulse shape. In particular, the present invention discloses an ultrafast fiber laser system operative to suppress the pulse pedestal by correcting the phase across a chirped optical pulse. The phase correction is performed by selectively heating and/or stretching multiple sections of a dispersion Bragg grating in response to signals from a pulse diagnostics system.

Prior Art

Ultrafast pulse lasers generate pulses that are shorter than 20 picoseconds and are as short as few femtoseconds. These lasers found application in medicine and in industry. Nearly all materials can be machined with such pulses since the process of multiphoton absorption does not require the wavelength of the laser to overlap to the absorption band of the material.

The ultrafast pulses exhibit increased pulse distortion due to optical nonlinearity introduced when optical pulses propagate through optical components/materials. The pulses start to degrade changing in shape and/or forming pre-pulses or post pulses increasing the total duration of the temporal envelope. This is an issue since many applications require ultrashort pulse with high peak power and high pulse energy without any temporal pedestal, as shown in FIG. 1 The temporal pedestal can be created due to higher order dispersion introduced through optical components or through intensity dependent optical nonlinearity, most often self-phase modulation (SPM). It has been shown that it is possible to correct most of the higher order dispersion using various pulse shaping techniques.

One popular method to extract more pulse energy increasing the threshold for SPM is called chirped pulse amplification. In this method the pulse are stretched in time by adjusting the phase of each longitudinal mode within the spectral envelope in a linear fashion. Bulk gratings, prisms, fiber, chirped fiber Bragg gratings or chirped volume Bragg gratings can be used to stretch the pulses by introducing this dispersion. The pulses can then be amplified through the gain material achieving higher pulse energy before reaching the peak powers that can induce the SPM. Finally, the pulses are compressed with a matching dispersion elements to recompress the pulses back down to picosecond or femtosecond pulse durations achieving the required pulse energy and the ultrashort pulses.

Even though Chirped Pulse Amplification (CPA) method can be used to extract significant pulse energies, this method is still limited. Typical configurations compensate the linear portion of the chirp. Higher order dispersion techniques are required to compensate the nonlinear chirp increasing the overall size of the system and requiring highly skilled workers to make the final adjustment to generate clean pedestal free optical pulses with duration of less than 1 ps and pulse energies of above 100 uJ.

Many advanced techniques have been developed involving pulse shaping. The phase and/or amplitude is adjusted across the output optical spectrum by various methods. A common method is to map the optical spectrum spatially using a bulk optical grating and a lens into the Fourier domain and then to manipulate the phase or amplitude using a phase modulator. Unfortunately, manual adjustment of the large number of pixels across the optical spectrum of the optical pulses is very time consuming.

The difficulties experienced during the manual adjustment have been addressed by automated techniques for adjusting the phases across the pulse including but not limited to multiphoton intrapulse interference phase scan (MIIPS) and spectral phase interferometry for direct electric field reconstruction (SPIDER). These and other automated techniques generate nearly transform limited (TL) pulses. These techniques are based on a free space pulse shaper that can determine the required phases across the optical spectrum in less than few minutes and many times within 10s of seconds. Yet such the free space pulse shaper, including different types of nematic liquid crystal is bulky requiring intricate free space alignment, which is not optimum for industrial applications.

An alternative component for compensating higher order dispersion, which is compact, rugged, and monolithic dispersive component, is a Fiber Bragg Grating (FBG). These references teach longer than nanosecond pulses that acquire a chirp due to dispersion while propagating through waveguides as opposed to purposely chirped pulses as required in a CPA laser system. The long pulses dealt with in these patents do not exhibit a pedestal-like phenomenon which is of a particular concern in high power short-pulsed CPA systems. Since the introduction of nonlinear FBG, a number of groups have tried to further optimize the performance. As the number of adjustable sections has grown, it has become challenging to manually perform the adjustments to determine the setting for each section for the optimum pulse shape.

It is, therefore, desirable to provide a CPA laser system with a tunable chirp stretcher or compressor adapted for controllable dispersion compensation to provide near transform-limited sub-ns pulses at the output of the CPA laser system.

It is also desirable to provide a method for adaptive dispersion compensation implemented in the disclosed CPA laser systems by utilizing modulation phase-shift scheme to calibrate the dispersive element and Chirp Reversal Technique to identify the phase correction for a large number of channels of the calibrated dispersive element.

SUMMARY OF THE DISCLOSURE

The disclosed structure meets this need by combining the compact tunable BG with a number of adjustable segments that manipulate phase of the incoming optical pulses and the pulse characteristic detection system, further referred to as pulse shaping unit, in a CPA-configured pulse laser system to create a compact and rugged ultrafast fiber laser with automated optimization of the optical pulses for industrial high volume laser production. This is achieved by replacing a cumbersome, free spacer pulse shaper of the prior art with a BG-configured shaper in the CPA-configured fiber laser system.

The inventive high power ultrashort pulse laser system is configured with a mode-locked oscillator or seed outputting nearly Fourier transform limited sub-ns pulses. Since in practice, perfectly transform limited pulses are very difficult to form, if at all, typically such pulses are referred to as nearly transform limited, but in this disclosure the word "nearly" may sometime omitted purely for the sake of clarity. The bottom line, ultrashort pulses from the laser each have the shortest possible duration for a specific optical bandwidth. The pulses are then stretched in time using a Bragg grating with nearly a linear group delay to frequency dependence. Propagating along the CPA laser system, this relationship gradually loses its linear characteristic leading to pulse broadening which ought to be corrected in order to output the desired TL ultrashort pulses.

In accordance with one aspect of the disclosure, a method of generating transform limited sub-nanosecond (sub-ns) pulses from in a CPA laser system is realized as follows. Initially, at least one of upstream and downstream BGs incorporated in the laser system is calibrated for frequency to segment dependence and for phase to temperature (or voltage) dependence. The calibrated shaper in conjunction with a measurement technique such as Chirp Reversal Techniques determined the required phase correction for each segment across the spectrum of each compressed pulse, thereby obtaining a desired or voltage or temperature profile. The determined profile is then applied to the segmented BG such that the segments are selectively actuated to adjust the spectral phase for each frequency of the pulse bandwidth to that characteristic for the TL ultrashort pulse.

In accordance with one feature of the disclosed method, the calibration of the segmented BG is performed using a modulation phase-shift method to determine both the segment to frequency and temperature to spectral phase. Alternatively, the calibration is performed to establish the segment to frequency and voltage to spectral phase dependencies. The implementation of these two features depends on a type of actuators corresponding to respective segments. The actuator may be selected from a thermoelectric cooler or piezoelectric transducer.

The phase correction calculation leading to parasitic pulse reduction or pedestal is realized by a number of methods of identifying the phase correction for a large number of segments. These methods or techniques may include MIIPS, d-scan, SPIDER, FROG, Chirp Reversal Technique (CRT) and others.

In accordance with a further aspect of the disclosure, the disclosed method is realized by the inventive CPA pulse laser system. The latter includes a mode-locked laser operative to output transform limited (TL) sub-nanosecond (sun-ns) pulses each having a spectral bandwidth and propagating along a path. The TL pulses are coupled to a first or upstream BG which is operative to stretch the TL sub-ns pulses. Propagating along the optical components of the inventive CPA laser system the spectral phase of stretched pulses deviates from that of TL pulses and becomes particularly articulated after a second BG performs their recompression.

The phase deviation for each frequency is measured by a pulse shaping unit which outputs a corrective signal applied across one of the first and second BG which is provided with multiple selectively tunable segments. In particular, the corrective signal is coupled into an array of actuators which selectively and controllably induce spectral phase changes on respective segments so as to adjust the spectral phase to that of the TL sub-ns pulse.

In accordance with one feature of the aspect of the disclosure, the upstream and downstream BGs each are a chirped fiber Bragg grating (CFBG) or volume Bragg grating (VBG). The BG also can also be either Tracey or Martinez type, but these are less preferable than the CFBG and VBG.

In accordance with another disclosed feature, the segmented BG is calibrated to have a predetermined frequency to segment dependence across the compressed pulse and spectral phase to temperature or spectral phase to voltage dependence.

In accordance with still another feature, the pulse shaping unit includes a measurement unit based on a CRT scheme, or MIIPS scheme or d-scan scheme. The measure corrective signal is coupled into the actuators which can be either a thermoelectric cooler (TEC) or piezoelectric element.

The inventive CPA laser system is packaged in a housing encasing the mode locked laser, the first and second BG and the pulse shaping unit. Thus from a manufacturing point of view, the disclosed system can be a stand-alone unit or be part of a larger system.

Although the above and other structural features as further recited in the attached claims, are each disclosed separately from the other inventive configurations, all of the disclosed here features of the invention are complementary to one another and can be used with one another in any possible combination.

BRIEF DESCRIPTION OF THE DRAWINGS

The above and other concepts, features and advantages will become more readily apparent from the disclosed below specifics of the inventive structure accompanied by the following drawings:

FIG. 3 the optical schematic of the disclosed CPA laser system;

FIG. 4A-4C illustrates the Chirp Reversal Technique (CRT).

FIG. 5 illustrates the inventive CPA laser system incorporating the CRT.

SPECIFIC DESCRIPTION

Figure 1:
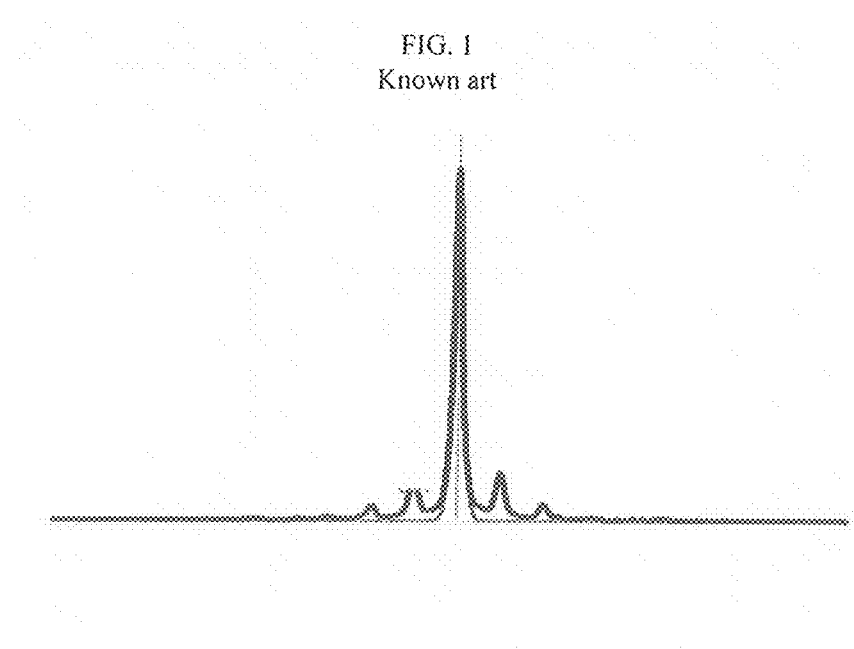
FIG. 1 is the indication of pedestals in time domain.
Figure 2:
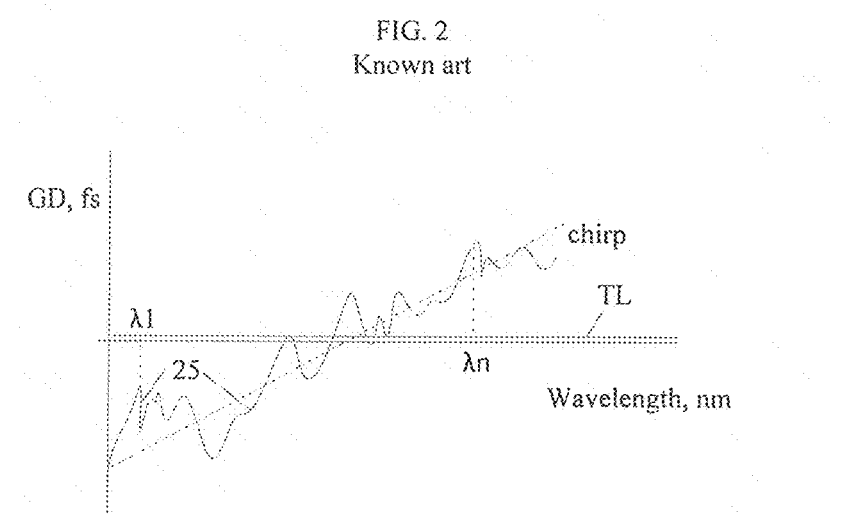
FIG. 2 is a highly diagrammatic view illustrating group delay v. wavelength relationship in CPA laser systems.

Reference will now be made in detail to embodiments of the invention. Wherever possible, same or similar reference numerals are used in the drawings and the description to refer to the same or like parts or steps. The drawings are in simplified form and are not to precise scale. The term "couple" and similar terms do not necessarily denote direct and immediate connections, but also include connections through intermediate elements or devices.

Referring to FIG. 3, inventive CPA laser system 50 includes a unit 55 for controlling a spectral profile of the system's output signal and is operative to minimize the pedestal for achieving a near transform limited pulse. The pulse broadening can be easily explained by manufacturing defects and detrimental consequences of nonlinear effects.

The exemplary schematic of system 50 features a master-oscillator power amplifier configuration, but can be configured with a single laser. The master oscillator 52 includes a mode locked pulsed laser or seed operative to lase out nearly TL pulses in a sub-ns pulse duration range with as short a pulse as a few femtoseconds (fs). The configuration of seed 52 may include, for example, a diode or fiber laser. The nearly TL pulses are coupled into an upstream routing device, such as optional fiber coupler or circulator 54.

The coupled pulses are sequentially stretched in a chirped fiber Bragg grating (CFBG) 56. CFBGs are typically manufactured using a UV laser and phase mask to introduce a modulation of the index of refraction along the fiber length, with the modulation period increasing or decreasing. As a result, CFBG effectively reflects light at different optical frequencies from within different portions of the FBG, introducing an optical group delay (GD) across the laser spectrum. A linear chirp, i.e., a linear dependence of the GD with frequency is preferred since it is the simplest way to stretch an optical pulse and easiest to correct for. The corresponding spectral phase varies quadratically with frequency.

Unfortunately, deviations from the pre-programmed GD dependence may occur during CFBG manufacturing, resulting in an inherent mismatch between the stretcher and compressor, and poor pulse recompression. In addition, other components introduce high-order dispersion, and a correction is required for the overall laser system dispersion to achieve transform-limited pulses at the laser output. To complicate things even further, as the pulse energy or average power is scaled higher, additional changes of the phase may occur, requiring dynamic correction of the phase distortion. This phase correction can be achieved using a tunable pulse shaper within the laser system.

The exemplary system 50 is all fiber laser system which, in addition to master oscillator 52, has at least one or more pre-amplification stages 58 and booster stage 62. The all fiber configuration of the amplifying stages is preferred since the use of fiber components improves the system's compactness, efficiency and ruggedness. However, other types of amplifiers may include solid state or crystal-host rare earth ion-doped amplifier such as YAGs and disk lasers, and also gas lasers, such as excimer lasers which are all part of the inventive scope of this disclosure. The pulse energy increase may be realized by increasing average power or coupling an acousto-optical or electro-optical modulator (EOM) 60 between the pre-amplifying and booster stages 58 and 62 respectively. The EOM 60 operates as a pulse picker well known to one of ordinary skill in the laser arts. The amplified chirped pulses propagate over free space after exiting another optional optical isolator 64 which minimizes backreflection of light detrimental to upstream components of system 50. The polarizer 66 in conjunction with a quarter waveplate and reflector/pulse compressor 68 is used as a circulator to direct the beam out of the laser head. The pulse compressor 68 is preferably a volume Bragg grating (VBG) operating in a manner which is well known to an artisan, but it also may be any other configuration, such as Treacy and Martinez bulk gratings. Although the FBG and VBG are shown and disclosed within the context of the inventive schematic of FIG. 3, both stretcher 56 and compressor 68 may be all fiber gratings or all bulk gratings or the stretcher can be a VBG while the compressor configured from fiber.

While chirped pulses are guided through all of the above components, the undesirable nonlinear chirp component becomes more and more prominent. However, it is another dispersive element—pulse compressor 68—and its manufacturing mismatch with CFBG 56 that noticeably increases the deviation of the phase and GD from the desired relationship with the frequency components across the pulse. As a result, the output recompressed pulses are not as narrow as nearly TL pulses at the output of seed 52 which is manifested by the presence of parasitic pre and post pulses forming the temporal pedestal in output pulses.

The parasitic pulse reduction or pedestal is realized by a number of methods of identifying the phase correction for a large number of channels such as segments in pulse shaper CFBG 56 discussed below. These methods may include MIIPS, d-scan, SPIDER, FROG, Chirp Reversal Technique (CRT) and others.

In FROG and SPIDER, the measurement and compression processes are fully isolated. The pulses to be characterized are redirected into a dedicated setup, where they are processed. The price one pays for using FROG and SPIDER is more complex characterization setup. Scanning techniques used in MIIPS and d-scan all well known to one of ordinary skill worker seem to be adequate for the purposes of this invention. However, MIIPS and d-scan are quite time consuming for the fiber-based shaper 56 due to the temperature response time.

CRT, on the other hand, is an asymptotic method requiring only two spectrally-resolved measurements to find the phase correction for all channels/segments of CFBG 56. For highly chirped pulses, as here, the asymptotic expression for the second harmonic generation (SHG) spectrum is given by $$I_{SHG}(2\omega, \phi_2) \propto \frac{I(\omega)^2}{|\phi_2 + \varphi''(\omega)|}$$

Here $\varphi''(\omega)$ is the unknown GDD profile, $\phi_2$ is the added known linear chirp.

The unknown GDD profile can be extracted from two SHG spectra (red and blue graphs in FIG. 4A) measured for two applied chirp values, $\phi_2^{(-)}$ and $\phi_2^{(+)}$, which are obtained in response to different temperature profiles applied to shaper 56, in accordance with the following:

$$\varphi''(\omega) = \frac{I_{SHG}^{(-)}(2\omega) \cdot \phi_2^{(-)} + I_{SHG}^{(+)}(2\omega) \cdot \phi_2^{(+)}}{I_{SHG}^{(-)}(2\omega) + I_{SHG}^{(+)}(2\omega)}$$

In this formula all intensity values are known as well as applied phase $\varphi_2$ for each frequency in each of two measurement. As a result, the GDD profile for each frequency across the bandwidth of the pulse is retrieved, as shown in FIG. 4B. Based on the retrieved GDD profile, the phase correction necessary for transform limited pulses is calculated by double integration of the retrieved GDD as seen in FIG. 4C. In other words, the method determines the deviation of the phase of the tested pulses from that of the TL pulse for each frequency of the pulse bandwidth.

The inventive schematic implementing the CRT of the invention is diagrammatically shown in FIG. 5 which is discussed in combination with the configuration shown in FIG. 3. The compressed pulses are focused into a nonlinear crystal 70, converting the fundamental frequency to its second harmonic, i.e., green light spectrum SHG generated in a nonlinear crystal 72 and further analyzed in automated pulse shaping unit 74, as explained in reference to FIG. 4A through FIG. 4C. For higher precision, it is desirable that two chirps having respective spectra be maximally different.

The calculated phase to wavelength relationship is converted to a temperature profile by controller 74 using the calibrated dispersive element, which is CFBG shaper 56 in the exemplary schematic of FIG. 3. The temperature profile is applied across shaper CFBG 56 such that the segments of the shaper are selectively and controllably heated or stretched to obtain, if necessary, the corrected phase for each frequency of the bandwidth. As can be readily understood, shaper CFBG 56 must be calibrated to provide the desired phase-temperature manipulation of each segment leading to the corrected phase because, figuratively speaking, it "understands" only the temperature to segment/channel relationship. The configuration of CFBG shaper 56 and a general technique for calibrating dispersive elements are explained immediately below.

The operation of stretcher/shaper 56 is conditioned by the configuration based on two separate but complementary techniques which include thermally inducing and strain inducing techniques. Each of these techniques can be implemented by the disclosed perturbation comb discussed below. The strain inducing technique is known for additional losses, decreased reliability, and a smaller phase adjustment. Hence the thermally induced stress technique is preferred, as explained below.

Figure 6:
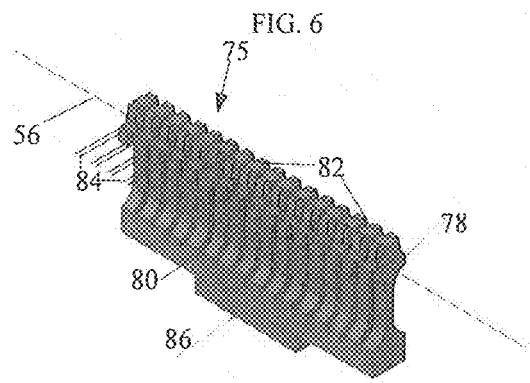
FIG. 6 illustrates one embodiment of a CFBG pulse shaper incorporated in the inventive CPA laser system of FIG. 3.
Figure 7:
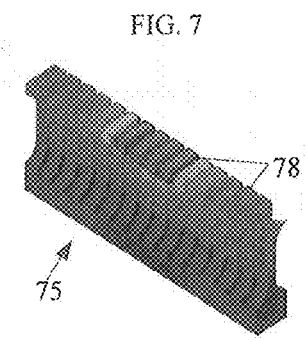
FIG. 7 illustrates the heating of the disclosed CFBG pulse shaper.

FIGS. 6 and 7 illustrate one of the disclosed herein structural embodiments of the inventive comb 75 implementing the thermally inducing stress technique. The comb 75 is configured with a plurality of spaced segments 78 corresponding to respective frequencies. Structurally, comb 75 may be constructed from a single piece of low heat conducting material, such as stainless steel, and includes a base 80 supporting spaced channels or segments 78. The stretcher/shaper 56 is placed in aligned recesses formed in respective upper portions of segments 78. Resistor heaters 82 and temperature sensors 84 are coupled to respective segments/channels 78 of low thermally conductive comb 75 to independently control the temperature of each segment/channel 78 such as to adjust the phase across the spectrum of the received compressed pulse to correspond to that of a transform-limited pulse. To enhance the temperature accuracy, a thermocouple 86 is fixed to the bottom side of base 80. Other means for cooling generally referred to as chillers are part of the inventive scope structure and can be based on a liquid or gas medium.

The color distinguished segments 78 in FIG. 7 illustrate selective application of heat to respective segments 78. For example, the "red" segments are directly affected by the applied stress, while different blue hues represent selective cooling of the base and adjacent thereto portions of respective segments 78.

Figure 8:
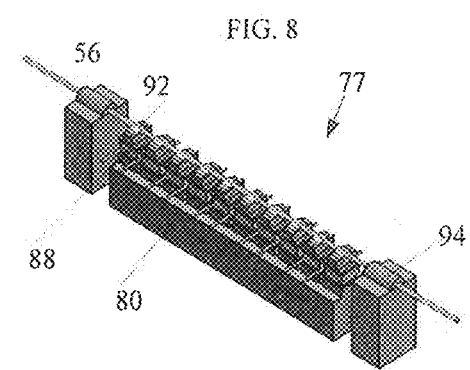
FIG. 8 is still another embodiment of the disclosed CFBG pulse shaper.

FIG. 8 illustrates a modified comb 77 configured with thermo-electric coolers 88 which are used instead of resistors 82 shown in FIG. 6. The comb 77 is provided with base 80 preferably made from coper and in being in thermal contact with numerous thermoelectric coolers (TEC) 88 which affect designated segments 92. The FBG 56 is mounted on segments 92 and coupled thereto by a heat conductive paste, whereas the opposite ends of FBG 56 are coupled to respective columns 94 by, for example, epoxy.

The principle of operation of comb 77 is similar to that disclosed in reference to FIGS. 6 and 7 and includes selectively actuating those TECs 88 that are associated with previously determined wavelengths, as explained below, in response to the command from controller 74 of FIGS. 3 and 5. The applied heat and stress change the refractive index in fiber regions corresponding to respective selected segments 92 which results in the controlled adjustment of the phase.

Figure 9:
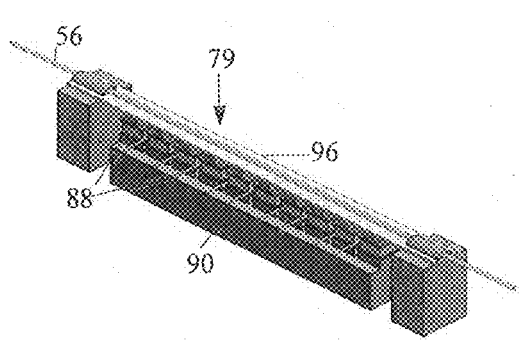
FIG. 9 is yet another embodiment of the disclosed CFBG pulse shaper.

FIG. 9 illustrates yet another embodiment of comb 79 operative to selectively affect regions or stretches of FBG 56. The fiber supporting structure is similar to that of FIG. 8 and includes base 90 supporting multiple coolers 88 which affect the desired stretches of FBG 56 in accordance with the operational principle of the CRT technique. The difference between structures of FIGS. 9 and 8 is a continuous plate 96 mounted on TECs 96 and made from highly heat nonconductive material.

Figure 10:
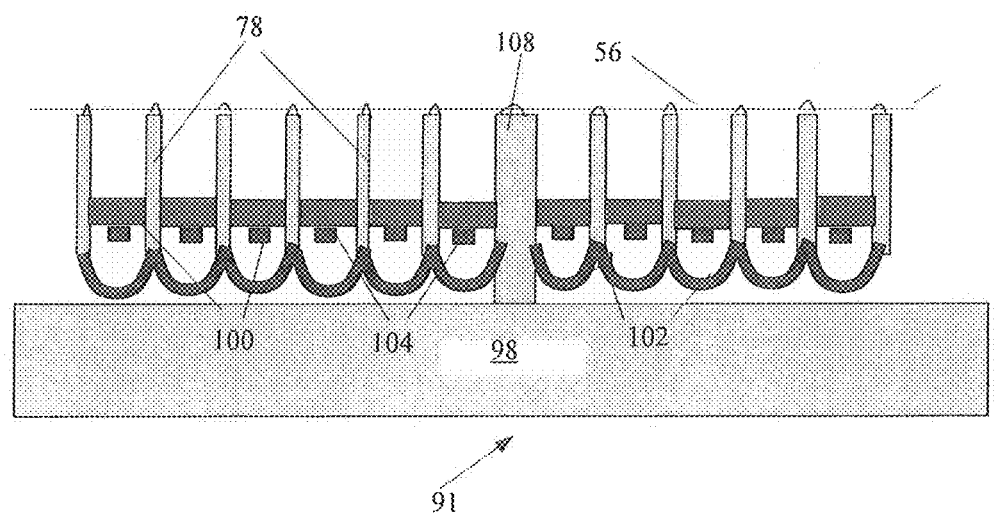
FIG. 10 is another embodiment of the disclosed CFBG pulse shaper.

FIG. 10 illustrates the application of still another configuration of comb 91 which operates to selectively affect stretches of FBG 56 and correct the nonlinear component of the chirp at the determined wavelengths. The configuration 91 includes a base 98 supporting a central segment 108. A multiplicity of high thermal resistance segments 78 flank central segment 108, and each pair of adjacent segments 78 is bridged by an individual plate 100 made from high thermal expansion material. Mounted to each plate 100 is a resistor 104 receiving respective signal from controller 74 of FIG. 3 to controllably heat and thus expand the designated plate 100. As a result, adjacent segments 78 are displaced relative to one another causing the fiber stretch calibrated against the wavelength in question and extending between the displaced segments to stretch. The above disclosed sequence of actions leads to the correction of phase between adjacent spectral components across the stretched pulse. As a result, the adjustment of the phase is such that a nonlinear chirp component is compensated to approach the transform limited pulse.

Figure 11:
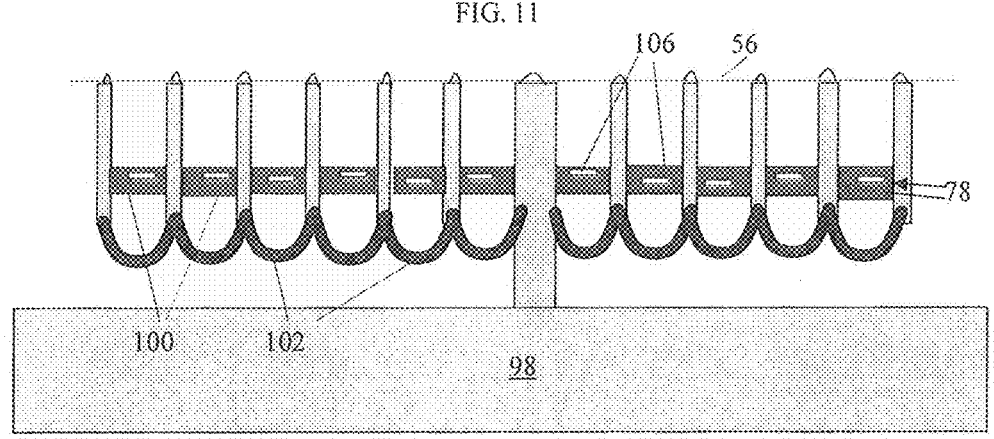
FIG. 11 is a further embodiment of the disclosed CFBG pulse shaper.

Since only single central segment 108 is coupled to base 98, the entire structure exhibits the desired flexibility since there are no lateral limiters preventing expansion of the adjacent segments when plate 100, extending between segments 78, is heated. The displacement of the entire configuration 91 is further facilitated by resilient components, such as springs 106, coupling the bottoms of respective adjacent segments FIG. 11 illustrates a comb similar to that of FIG. 10, but instead of resistively heating plates 100, the shown comb is provided with a plurality of piezo elements 106. The strain inducing configuration has the shortest time response due to the nature of piezo elements.

Figure 12:
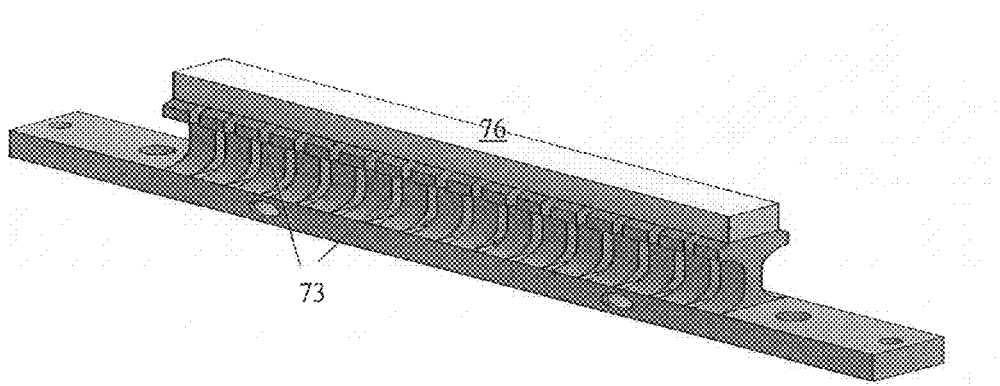
FIG. 12 illustrates the inventive VBG compressor operating as a pulse shaper in the schematic of FIG. 3.

Referring to FIG. 12, instead of using CFBG 56 as the pulse shaper, all of the above discussion can be applied to VBG 76. The use of VBG compressor 76 as the shaper avoids drawbacks typical for FBG which are relatively easily susceptible to external and internal stresses. A variety of structural modifications can be used in the context of selectively applying thermal and strain stress to VBG 76. For example, one can use multiple TECs or resistors thermally coupled to respective bottom segments of the VBG, as shown in FIG. 7, so as to selectively affect the desired segments of this grating in accordance with the CRT method. As illustrated in FIG. 12, an array of piezoelectric elements 71 can be used instead of thermal actuators.

Now as various structural configurations of the disclosed shaper have been discussed, it is necessary to remember that the CRT method requires the pulse shaper calibration. In particular, the shaper needs channel/segment to wavelength calibration and establish the relationship between temperature tuning and induced phase change. The method of the pulse shaper calibration utilized within the scope of this invention is based on the modulation phase-shift (MPS) technique known to one of ordinary skill worker in the laser arts and briefly discussed immediately below in light of the inventive pulse shaper.

Figure 13:
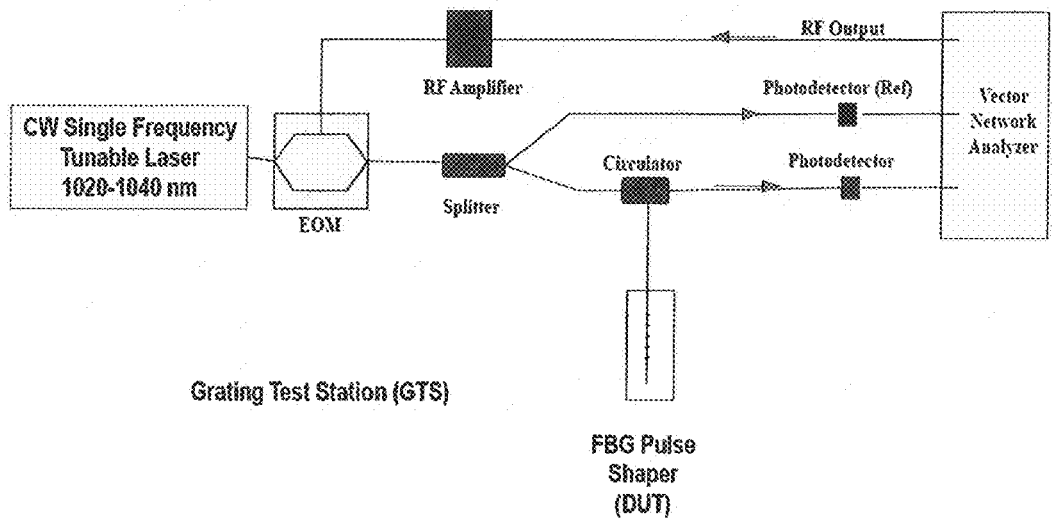
FIG. 13 illustrates a test station implementing the phase shift method for calibrating the disclosed CFBG pulse shaper.

FIG. 13 illustrates a typical modulation phase-shift scheme or Grating Test Station (GTS). It includes a continuous wave (CW) single frequency tunable laser within a desired bandwidth, for example 1020-1040 nm. The optical output is modulated by radio frequency in electro-optical modulator EOM. The optical output is split in a splitter between a reference arm and other arm which is provided with a circulator redirecting light towards FBG pulse shaper 56 affecting a shift in phase. The photodetectors coupled in respective arms measure the received light and output electrical signals having a shift of phase therebetween which is determined in Vector Network Analyzer outputting the measure difference through an RF amplifier which is coupled into the EOM. The determined electrical phase shift correlates with optical group delay (GD) (or group delay dispersion GDD) which when integrated once (twice for GDD) results in the measured optical phase shift.

Figure 14:
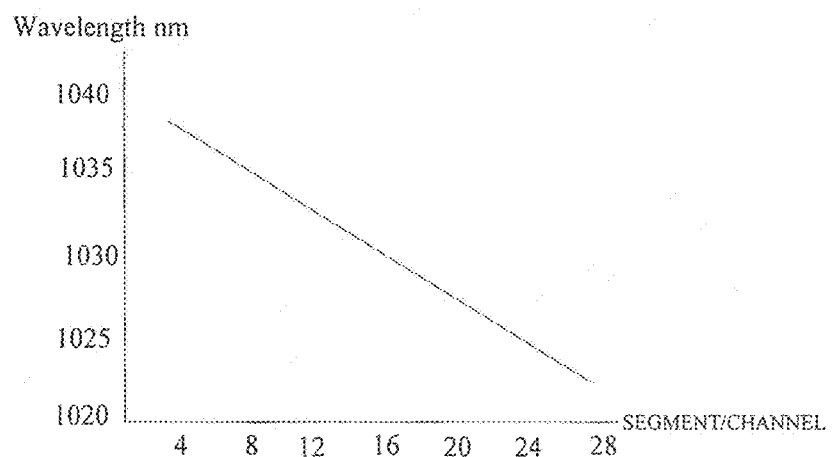
FIG. 14 illustrates channel to wavelength calibration of the CFBG pulse shaper using the phase shift method.

Utilizing the phase-shift scheme of FIG. 13, the linear fit and interpolation based on the data for a number of heated channels, for example four, is determined. As can be seen in FIG. 14, each of the channels/segments (28 on this example) on the tested shaper corresponds to respective wavelengths.

Figure 15:
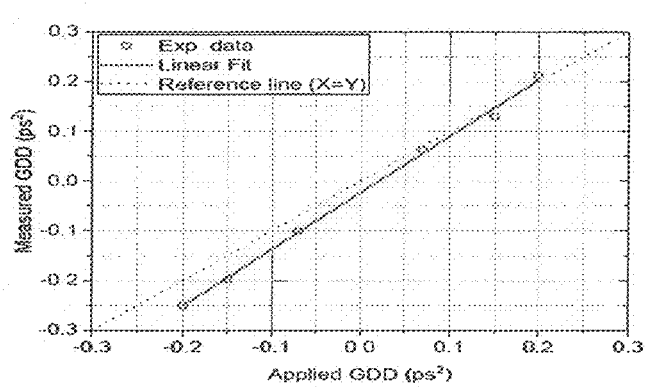
FIG. 15 illustrates a technique for determining the proportionality factor in phase to temperature calibration of the inventive CFBG pulse shaper by the phase shift method.

For phase-to-temperature calibration, the assumption is that the phase change per channel is proportional to the temperature difference. It allows the user to make an initial guess for the proportionality factor. Using this factor, a phase mask for a certain amount of group delay dispersion (GDD) is generated and encoded with CFBG pulse shaper 56. The phase-shift method is used to measure the actual GDD, as illustrated by red line in FIG. 15. The discrepancy between the guessed (dot line in FIG. 13) and measured GDD values is used to adjust the initial guess for the proportionality factor (PF).

Based on the foregoing, what is left to do is to convert the spectral phase in FIG. 4C to temperature. This is automatically done by controller 74 which provides the division of phase values of FIG. 4C by the determined proportional factor. In addition, the relationship between the wavelength and respective segments has also been determined. As a result, segments 78 are selectively and controllably heated by respective coolers to adjust the phase shift for each frequency such that the shaped pulse is substantially free from the pedestal and has the shape approaching that of transform limited pulses.

Revisiting briefly the shown embodiments of the inventive shaper operated with piezoelectric actuators, in light of the foregoing description of the CRT/MPH techniques, as known, the piezo only requires a voltage. Accordingly, the calibration in this case includes the same as above-discussed the wavelength to channel/segment dependence and instead of temperature to phase relationship, the voltage to phase dependence realized by the disclosed above techniques.

Figure 16A:
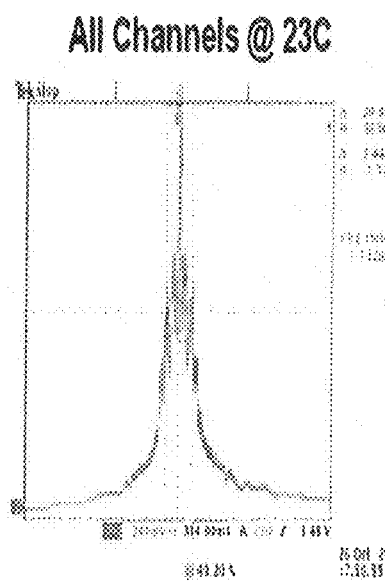
FIG. 16A and FIG. 16B illustrate respective experimental results obtained by the disclosed CPA laser system of FIG. 3.
Figure 16B:
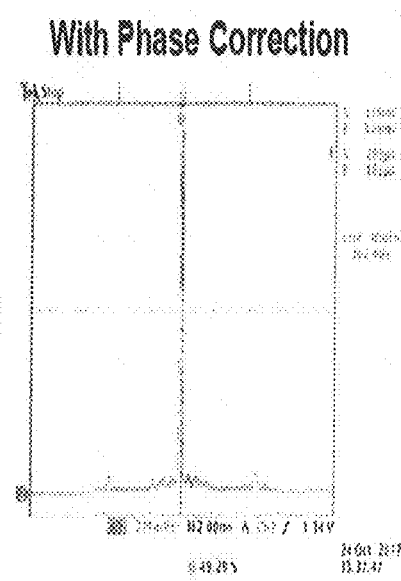

FIG. 16 illustrate how the disclosed structure and method significantly improve the shape of ultrashort pulses. The above-disclosed CPA laser system, including a mode-locked laser, optional amplifying stages, dispersive elements and a pulse shaping unit forming a closed loop with one of the dispersive elements, is packaged within a housing and can be used as a standalone unit.

In summary, the disclosed rugged pulse shaper has been developed, adding no extra optical losses in the laser system. Pulses with up to 100 µJ energies at the laser output are compressed to <300 fs. Further improvement in pedestal suppression is deemed possible by increasing the number of control channels. In addition, faster response times are expected for pulse shapers based on multi-channel thermal electric coolers that are under construction at IPG Photonics. Other laser configurations may benefit from such devices to scale the output pulse energy further.

Although the present disclosure has been described in terms of the disclosed example, numerous modifications, such the use of other pulse shaping systems including FROG, or a combination of heating and straining components, and/or all FBGs or all VBGs or tuning both stretcher and shaper or any other additions to the above-disclosed embodiments would be readily apparent to one skilled in the laser arts without departing however from the scope and spirit of the following claims.

The invention claimed is:

1. A method of generating transform limited sub-nanosecond (sub-ns) pulses at the output of a chirped pulse amplification (CPA) laser system which is configured with a laser source emitting nearly transform limited (TL) sub-nanosecond (sub-ns) pulses along a path, a first Bragg grating (13G) stretching TL pulses, and a second BG recompressing the chirped pulses, the method comprising:
   calibrating at least one of the first or second BGs, the calibrated BG having a plurality of spaced segments, wherein the calibration includes:
      determining segment to frequency correspondence across the one BG, and
      determining temperature to spectral phase dependence or voltage to spectra phase dependence across the one BG;
   calculating a phase correction for each segment across a spectrum of each compressed pulse, thereby obtaining a desired voltage or temperature profile; and
   applying the desired temperature or voltage profile to the one BG, thereby selectively actuating the segments to tune the one BG so as to output the near transform limited compressed sub-ns pulses.

2. The method of claim 1, wherein the calibration of the tunable one BG is performed using a modulation phase-shift method to determine both the segment to frequency and temperature to spectral phase or voltage to spectral phase dependencies.

3. The method of claim 2, wherein the temperature or voltage to spectral phase dependence varies from segment to segment or is uniform for all segments.

4. The method of one of claim 1, wherein the phase correction calculation utilizes multiphoton intrapulse interference phase scan (MIIPS), Chirp Reversal Technique (CRT) or d-scan.

5. A chirped pulse amplification (CPA) pulse laser system comprising:
   a mode-locked laser operative to output near transform limited (TL) sub-nanosecond (sub-ns) pukes having a spectral bandwidth and propagating along a path;
   a first Bragg gratings (BG) spaced downstream from the mode-locked laser and operative to stretch the TL sub-ns pulses coupled into the first BG;
   a second BG spaced downstream from the first BG and operative to recompress the stretched pulses, wherein one of the first or second BGs is configured with a plurality of tunable segments corresponding to respective wavelengths of the bandwidth;

an array of actuators coupled to respective segments; and a pulse shaping unit operative to determine a deviation of the spectral phase for each wavelength of the bandwidth of the compressed pulse from that of the IL sub-ns pulse, and to output corrective signals coupled into the array of actuators which selectively and controllably induce spectral phase changes on respective segments of the one BG so as to adjust the spectral phase to that of the TL sub-ns pulse.

6. The CPA laser system of claim 5, wherein the first and second BGs each are a chirped fiber Bragg grating (CFBG) or volume Bragg grating (VBG).

7. The CPA laser system of claim 5, wherein the one BG is calibrated to have a predetermined frequency to segment dependence across the compressed pulse and spectral phase to temperature or spectral phase to voltage dependence.

8. The CPA laser system of one of claim 5,
wherein the pulse shaping unit includes a measurement unit based on a CRT scheme, or MIIPS scheme or d-scan scheme.

9. The CPA laser system of claim 5, wherein the actuators each include a heating element or piezoelectric element.

10. The CPA laser system of claim 5, wherein the one BG is configured with a base supporting the array of actuators, and plurality of spaced segments each of which is coupled to the actuator.

11. The CPA laser system of claim 5 further comprising a housing encasing the mode locked laser, the first and second BG and the pulse shaping unit.

12. The CPA laser system of claim 5, wherein the mode-locked laser has a master oscillator power amplifier architecture with one or more amplifying stages flanked by the first and second BGs, the power amplifier being selected from the group consisting of fiber amplifiers, and crystal-host rare earth ion-doped amplifiers.

13. The CPA laser system of claim 5, wherein the one BG further includes a plurality of resistors coupled to respective segments.

14. The CPA laser of claim 5, wherein the one BG is configured with a single central column mounted on the base, a plurality of side segments flanking the base and coupled to the central segment, and a plurality of resilient components extending between adjacent segments.

15. The CPA laser of claim 5, wherein the one BG further comprising a continuous plate supporting the CFBG or VBG and coupled to respective actuators.

* * * * *